(12) United States Patent
Derakhshani et al.

(10) Patent No.: US 11,341,880 B1
(45) Date of Patent: May 24, 2022

(54) MULTI-SENSOR SCENE BRIGHTNESS ANALYSIS TO CHECK CAMERA PIPELINE INTEGRITY

(71) Applicant: EyeVerify, Inc., Kansas City, MO (US)

(72) Inventors: Reza R. Derakhshani, Shawnee, KS (US); Spandana Vemulapalli, Kansas City, MO (US); Tetyana Anisimova, Shawnee, KS (US)

(73) Assignee: EyeVerify Inc., Kansas City, MO (US)

( * ) Notice: Subject to any disclaimer, the term of this patent is extended or adjusted under 35 U.S.C. 154(b) by 0 days.

(21) Appl. No.: 17/230,397

(22) Filed: Apr. 14, 2021

(51) Int. Cl.
   *G01J 1/42* (2006.01)
   *G09G 3/04* (2006.01)

(52) U.S. Cl.
   CPC .............. *G09G 3/04* (2013.01); *G01J 1/4204* (2013.01); *G09G 2320/0626* (2013.01); *G09G 2360/144* (2013.01)

(58) Field of Classification Search
   CPC ............. G09G 3/04; G09G 2320/0626; G09G 2360/144; G01J 1/4204
   See application file for complete search history.

(56) References Cited

U.S. PATENT DOCUMENTS

| | | | |
|---|---|---|---|
| 2015/0213781 A1* | 7/2015 | Huang | G09G 5/06 345/207 |
| 2020/0043407 A1* | 2/2020 | Konishi | G01N 21/95 |

* cited by examiner

*Primary Examiner* — Que Tan Le
*Assistant Examiner* — Don J Williams
(74) *Attorney, Agent, or Firm* — Fish & Richardson P.C.

(57) ABSTRACT

Technology described herein includes a method that includes receiving, at one or more processing devices at one or more locations, one or more image frames; receiving, at the one or more processing devices, one or more signals representing outputs of one or more light sensors of a device; estimating, by the one or more processing devices based on the one or more image frames, one or more illuminance values; determining, by the one or more processing devices, that a degree of correlation between (i) a first illuminance represented by the one or more illuminance values and (ii) a second illuminance represented by the one or more signals fails to satisfy a threshold condition; and in response to determining that the degree of correlation fails to satisfy the threshold condition, determining, by the one or more processing devices, presence of an adverse condition associated with the device.

20 Claims, 5 Drawing Sheets

MULTI-SENSOR SCENE BRIGHTNESS ANALYSIS TO CHECK CAMERA PIPELINE INTEGRITY

TECHNICAL FIELD

This specification generally relates to detecting hardware hijack or hardware malfunction.

BACKGROUND

The modern digital security is threatened by increasing number of hardware attacks. For example, in camera hijack and video replay attacks, an attacker may take over a camera by hijacking the camera drive and replace the camera output with the attacker's injected feed. For instance, the attacker may feed a user's image or other video feed of interest to a biometric authentication system. Similarly, the digital security may be threatened by hardware malfunction.

SUMMARY

Implementations of the present disclosure are generally directed to detecting adverse condition associated with a device, such as hardware hijack or hardware malfunction. The hardware can be a camera or one or more light sensors of the device. For example, implementations are directed to detecting camera pipeline tampering or similar attacks and malfunctions. Implementations are also directed to detecting light sensor attacks and malfunctions.

More specifically, implementations are directed to receiving one or more image frames, and receiving one or more signals representing outputs of one or more light sensors of a device. The one or more image frames and the one or more signals are cross checked to detect hardware hijack or hardware malfunction. For example, the one or more image frames can indicate a first illuminance. The one or more signals can indicate a second illuminance. If the first illuminance and the second illuminance are correlated with each other, it is determined that the hardware is legitimate; otherwise, the presence of an adverse condition (e.g., hardware hijack or hardware malfunction) is determined. In operation, a degree of correlation between the first illuminance and the second illuminance is determined and compared to a threshold condition. The presence of the adverse condition is determined based on whether the degree of correlation satisfies the threshold condition.

In one aspect, this document describes a method that includes receiving, at one or more processing devices at one or more locations, one or more image frames; receiving, at the one or more processing devices, one or more signals representing outputs of one or more light sensors of a device; estimating, by the one or more processing devices based on the one or more image frames, one or more illuminance values; determining, by the one or more processing devices, that a degree of correlation between (i) a first illuminance represented by the one or more illuminance values and (ii) a second illuminance represented by the one or more signals fails to satisfy a threshold condition; and in response to determining that the degree of correlation fails to satisfy the threshold condition, determining, by the one or more processing devices, presence of an adverse condition associated with the device.

In another aspect, this document describes a system that includes one or more processing devices; and one or more computer memory devices interoperably coupled with the one or more processing devices and having tangible, non-transitory, machine-readable media storing one or more instructions that, when executed by the one or more computing devices, perform one or more operations including receiving, at one or more locations, one or more image frames; receiving one or more signals representing outputs of one or more light sensors of a device; estimating, based on the one or more image frames, one or more illuminance values; determining that a degree of correlation between (i) a first illuminance represented by the one or more illuminance values and (ii) a second illuminance represented by the one or more signals fails to satisfy a threshold condition; and in response to determining that the degree of correlation fails to satisfy the threshold condition, determining presence of an adverse condition associated with the device.

In another aspect, this document describes one or more non-transitory computer-readable storage devices coupled to one or more processors and having instructions stored thereon which, when executed by the one or more processors, cause the one or more processors to perform various operations. The operations include receiving, at one or more locations, one or more image frames; receiving one or more signals representing outputs of one or more light sensors of a device; estimating, based on the one or more image frames, one or more illuminance values; determining that a degree of correlation between (i) a first illuminance represented by the one or more illuminance values and (ii) a second illuminance represented by the one or more signals fails to satisfy a threshold condition; and in response to determining that the degree of correlation fails to satisfy the threshold condition, determining presence of an adverse condition associated with the device.

Implementations of the above aspects can include one or more of the following features. In some implementations, the adverse condition includes one of hardware hijack or hardware malfunction. The hardware includes at least one of a camera and the one or more light sensors of the device.

In some implementations, estimating the one or more illuminance values includes estimating an illuminance value corresponding to each image frame based on one or more camera parameters. The one or more camera parameters include at least one of: sensitivity to light (ISO), exposure time, and aperture.

In some implementations, determining the degree of correlation between the first illuminance and the second illuminance includes identifying, based on the one or more signals representing outputs of the one or more light sensors of a device, and from a trained model that represents a relationship between illuminance values and corresponding outputs of the one or more light sensors, a predicted illuminance as the second illuminance; calculating a dissimilarity score between the predicted illuminance and the first illuminance; and determining the degree of correlation based on the dissimilarity score. A lower dissimilarity score is associated with a higher degree of correlation.

In some implementations, determining the degree of correlation between the first illuminance and the second illuminance includes receiving a plurality of image frames; estimating a first time series of illuminance values corresponding to the plurality of image frames; estimating a second time series representing the outputs of the one or more light sensors of the device corresponding to the plurality of image frames; and determining the degree of correlation between the first time series and the second time series.

In some implementations, determining the degree of correlation between the first time series and the second time series includes computing a correlation coefficient.

Particular implementations of the subject matter described in this disclosure can be implemented so as to realize one or more of the following advantages. Implementations of the present disclosure can be used, for example, for detecting hardware hijack or hardware malfunction. The hardware can be one of a camera and one or more light sensors of a device. In the absence of any hardware hijack or hardware malfunction, the image frames captured by the camera and the one or more signals from the light sensors both reflect the same illuminance of a scene. As a result, a degree of correlation is determined between a first illuminance derived from one or more image frames and a second illuminance represented by one or more light sensor signals. Based on whether the degree of correlation satisfying a threshold condition, it is determined whether the adverse condition (e.g., hardware hijack or hardware malfunction) is present. The technology described herein allows for detecting and preventing hardware hijack or hardware malfunction based on embedded camera and sensors of the same device. Thus, the technology described herein can create federated trust and improve digital security while reducing requirements for additional hardware. This in turn, in some cases, can reduce costs associated with an underlying authentication system.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to detection of hardware hijack or hardware malfunction. In various biometric authentication applications, a user is required to scan his/her face or scan documents for further processing. Malicious actors often try to breach the integrity of such a system, for example, by hijacking a camera and/or other hardware of the system, and replacing one or more image frames with the attacker's injected feed in an effort to tamper with the authentication system. Once one or more image frames are received for authentication, implementations of the present disclosure can be used, for example, for verifying integrity of the received one or more image frames and identifying camera hijack/malfunction. Similarly, implementations of the present disclosure can be used, for example, for verifying integrity of the outputs of the one or more light sensors of the device and identifying light sensor hijack/malfunction.

In some implementations of a biometric authentication system, one or more image frames captured by a camera of a device are received together with one or more corresponding signals representing outputs of one or more light sensors of the device. The one or more image frames and the one or more signals are cross checked to detect hardware hijack or hardware malfunction. Specifically, one or more processing devices can estimate a first illuminance based on the one or more image frames and also a second illuminance represented by the one or more signals. A degree of correlation is determined between the first illuminance derived from the one or more image frames and the second illuminance represented by the one or more light sensor signals. If the degree of correlation fails to satisfy a threshold condition, a determination may be made that an adverse condition (e.g., hardware hijack or hardware malfunction) associated with the device is present, and accordingly, the biometric authentication process can be aborted to prevent unauthorized access to the underlying secure system. The technology described herein therefore can allow for a hardware-hijack detection system to be implemented even on resource-constrained environments such as mobile devices. By allowing for a quick discrimination between legitimate and illegitimate images, additional processing can be preemptively terminated, thereby creating an additional layer of security.

Figure 1:
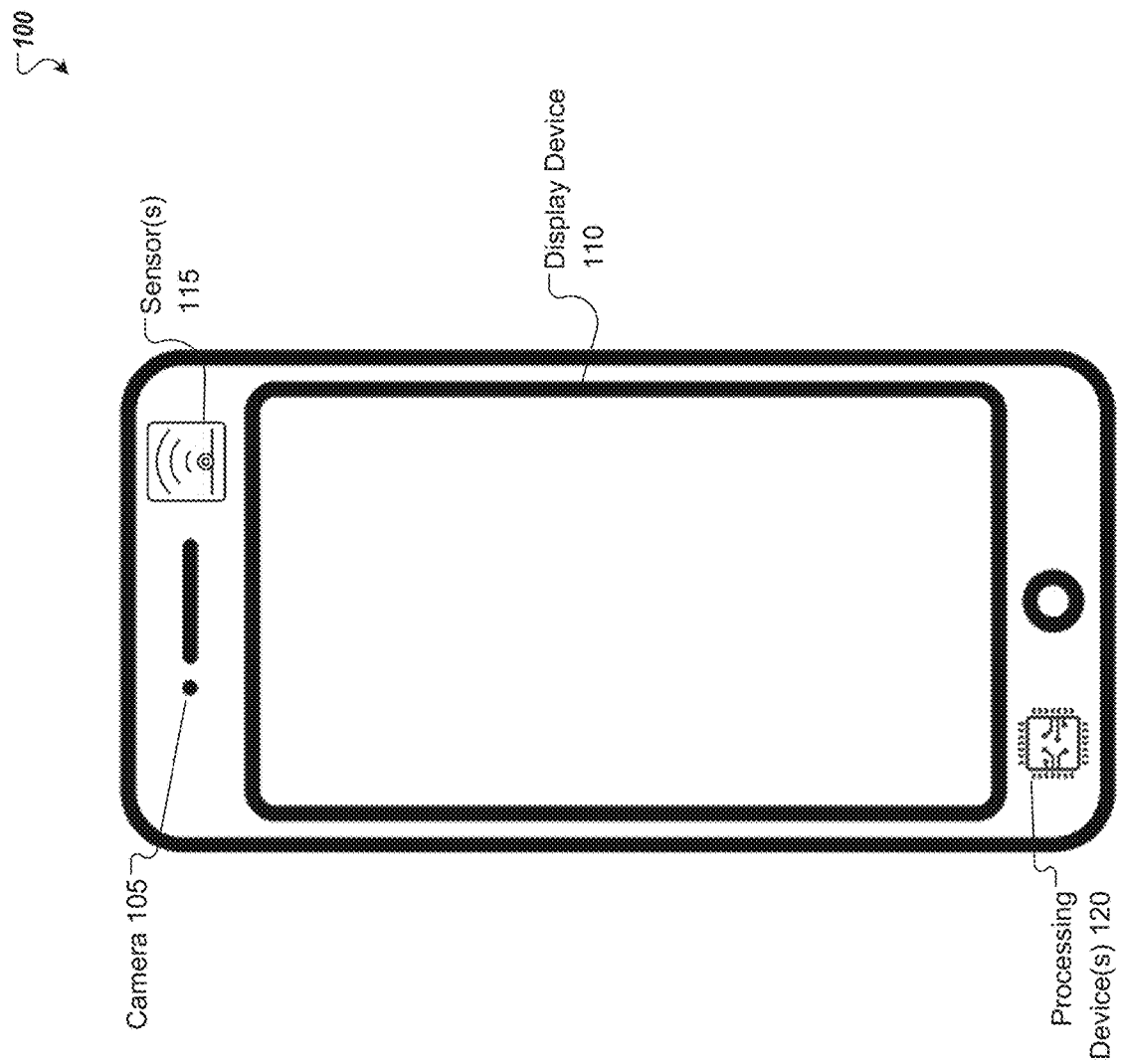
FIG. 1 shows a device as an example environment for detecting hardware hijack or hardware malfunction in accordance with one or more embodiments of the present disclosure.

FIG. 1 shows a device 100 as an example environment for detecting hardware hijack and/or hardware malfunction. In some embodiments, a user may use the device 100 to request a service or to request an access to secure resources. For example, in some electronic transactions, the device 100 can allow a user to scan his/her face for authentication to make a payment or withdraw money from a bank account. In another example, the device 100 can allow a user to scan documents needed in electronic transactions. In such cases, it is important to ensure the images received from the device 100 are trustworthy. In other words, it is important to detect adverse condition, such as hardware hijack/malfunction, to ensure that the information needed for certain applications (e.g., a biometric authentication process) is legitimate.

The examples of the device 100 may include, but are not limited to, a mobile phone, a laptop computer, a desktop computer, a wearable device, a personal digital assistant (PDA), a tablet, an e-reader, and the like. While FIG. 1 shows the device 100 to be a portable device, in some implementations, the device 100 can be a non-portable device such as a kiosk device, a vending machine, an automated teller machine (ATM) etc.

In some implementations, the device 100 can include one or more components that support the hardware hijack/malfunction detection. For example, the device 100 can include an image acquisition device, such as a camera 105. The camera can be employed to capture image frames of users interacting with the device 100. In some examples, the captured image frames may be used in authenticating users before permitting access to underlying secure services/products. For example, the device 100 can include a display device 110 (e.g., a capacitive touch screen) that allows a user to interact with an application installed on the device 100.

For instance, the application may be an online shopping application. Once the user completes the selection of products via the user interfaces presented on the display device 110, the user may be asked to look towards the camera 105 for face-image based biometric authentication. The one or more image frames captured using the camera 105 may be used to authenticate/identify the user against a pre-stored template image of the user, and upon successful authentication, payment may be automatically deducted from an account linked to the template image.

In an example of an adverse event, an attacker may hijack the camera or a communication link over which images are transmitted, and later use such images to gain unauthorized access into the online shopping application. Because the attacker would use actual images of a user, without appropriate safeguards, the attacker may be able to breach the authentication process, for example, to make unauthorized payments with the user's account. The technology described herein allows for verifying that image frames received for an authentication process are images captured during a legitimate authentication request initiated by the user, and not spurious images stolen from a set of frames captured at a different time. This is done by correlating illuminance estimated from a set of frames with corresponding illuminance independently estimated based on signals from one or more other sensors of the device, and flagging potential hardware hijack/malfunction in case of a mismatch between the two illuminances.

In some implementations, the device 100 can include one or more light sensors 115, such as ambient light sensors, that can collect information indicative of scenery illuminance. For example, as the user scans an object with his/her mobile device, the one or more light sensors 115 of the device can be configured to pick up scenery illuminance. In addition, scenery illuminance can be determined independently by analyzing the corresponding set of frames captured using the camera. Inconsistencies between these two independent estimates of illuminance may be used to determine the presence of an adverse condition such as hardware hijack or malfunction.

In some implementations, the device 100 can include one or more processing devices 120 that can execute one or more processes to detect hardware hijack/malfunction. In some other implementations, the device 100 may communicate with one or more other processing devices (e.g., at a remote server (not shown)) that can perform the detection of hardware hijack/malfunction.

To perform the detection of hardware hijack/malfunction, the one or more processing devices 120 can be configured to estimate a first illuminance based on the one or more image frames. For example, the one or more processing devices 120 can be configured to estimate one or more illuminance values based on scenery (e.g., a user and/or background) as captured in the one or more image frames. The first illuminance can be represented by the one or more illuminance values. Different methods can be used to estimate the first illuminance, including a static correlation determination process and a dynamic correlation determination process, which are described below in details.

In some implementations, the one or more processing devices 120 can be configured to estimate a second illuminance based on the one or more signals from the light sensors 115. In the absence of any hardware hijack or hardware malfunction, the image frames captured by the camera 105 and the concurrent one or more signals from the light sensors 115 both reflect the same illuminance of the scenery. As a result, a degree of correlation determined between the first illuminance derived from the one or more image frames and the second illuminance represented by one or more light sensor signals can be indicative of whether the image frames captured by the camera 105 and the one or more signals from the light sensors 115 are in fact captured at the same time. In some implementations, based on whether the degree of correlation satisfies a threshold condition, a determination whether an adverse condition (e.g., hardware hijack/malfunction) is present can therefore be made. For example, if a degree of correlation satisfies the threshold condition (e.g., a metric of correlation calculated based on the first and second illuminances are above a predetermined threshold value), a determination can be made that the image frames are legitimate and no adverse condition is present. On the other hand, if the degree of correlation fails to satisfy the threshold condition (e.g., the metric of correlation calculated based on the first and second illuminances are below the predetermined threshold value), a determination may be made that the one or more signals from the light sensors 115 is inconsistent with the image frames, and therefore an adverse condition such as a hardware hijack or malfunction likely exists. Responsive to determining such an adverse condition, the biometric authentication process can be aborted to prevent access to the underlying secure system.

Figure 2:
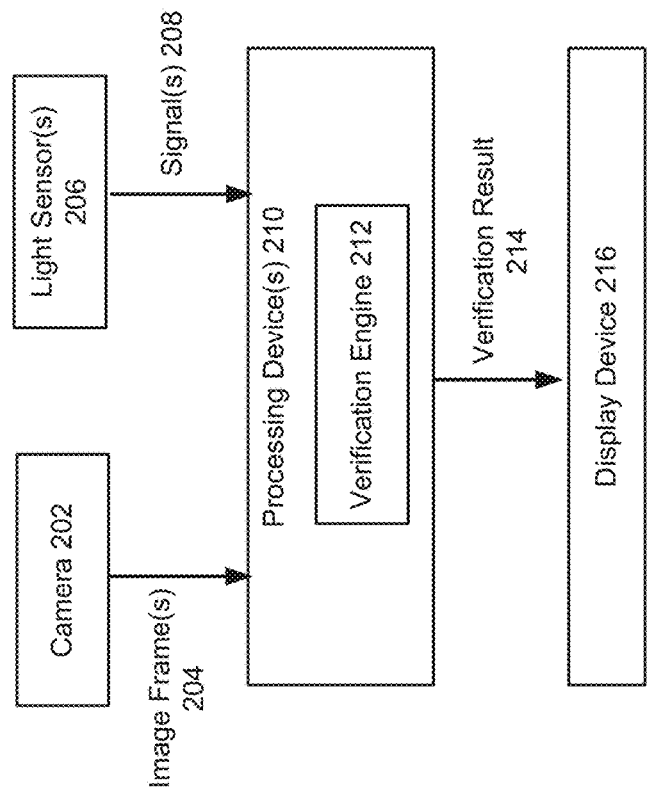
FIG. 2 shows an example of a system for detecting hardware hijack or hardware malfunction in accordance with one or more embodiments of the present disclosure.

FIG. 2 shows an example of a system 200 that can be used to implement the technology described herein. The system 200 includes a camera 202, one or more light sensors 206, one or more processing devices 210, and a display device 216. In some implementations, the system 200 may be included within a device, such as described with reference to FIG. 1. For example, the camera 202 can be the camera 105, the one or more light sensors 206 can be the one or more light sensors 115, the one or more processing devices 210 can be the one or more processing devices 120, and the display device 216 can be the display device 110.

In some implementations, the camera 202 can detect and convey in the form of one or more image frames 204 (e.g., an arrangement of pixel values). The camera 202 can capture the one or more image frames 204 as a user scans an object. For example, the user may be required to scan his/her face using the camera 202 of the device for identification authentication, and the camera 202 can be configured to capture one or more image frames 204 in the process. In some implementations, the one or more light sensors 206 can be configured to collect information indicative of scenery illuminance and generate the one or more signals 208.

The processing device 210 can include a verification engine 212 that verifies the integrity of the one or more image frames 204. For example, the verification engine 212 can verify whether the one or more image frames used for a biometric authentication process are legitimate, or coming from a potential hardware hijack condition. Similarly, the verification engine 212 can be configured to verify that the one or more signals 208 are consistent with the one or more image frames, and therefore coming from non-malfunctioning sensors.

The verification engine 212 can receive the one or more image frames 204 and the one or more signals 208 and verify the integrity of the received information. Specifically, the verification engine 212 can cross check the one or more image frames 204 and the one or more signals 208 with one another to identify whether they are consistent in reflecting a scenery illuminance.

In some implementations, the verification engine 212 can be configured to estimate a first illuminance based on the one or more image frames 204. For example, the verification engine 212 can be configured to estimate one or more illuminance values (representing the first illuminance) based on scenery included in the one or more image frames 204. Furthermore, the verification engine 212 can be configured to estimate a second illuminance based on the one or more signals 208.

In the absence of any hardware hijack or hardware malfunction, the image frames 204 captured by the camera 202 and the one or more signals 208 from the light sensors 206 both reflect the same scenery illuminance. As a result, a degree of correlation between the first illuminance derived from the one or more image frames 204 and the second illuminance independently derived from one or more light sensor signals 208 can be indicative of presence of hardware hijack and/or malfunction. Based on whether the degree of correlation satisfies a threshold condition, the verification engine 212 can determine the verification result 214 regarding the presence of hardware hijack and/or malfunction. After deriving the verification result 214, the verification engine 212 can display the verification result 214 on the display device 216. The display device 216 can be configured to present various types of data, such as text, image, audio, video, and the like. The display device 216 can include a graphical user interface (GUI) that allows the user to interact with one or more applications.

Figure 3:
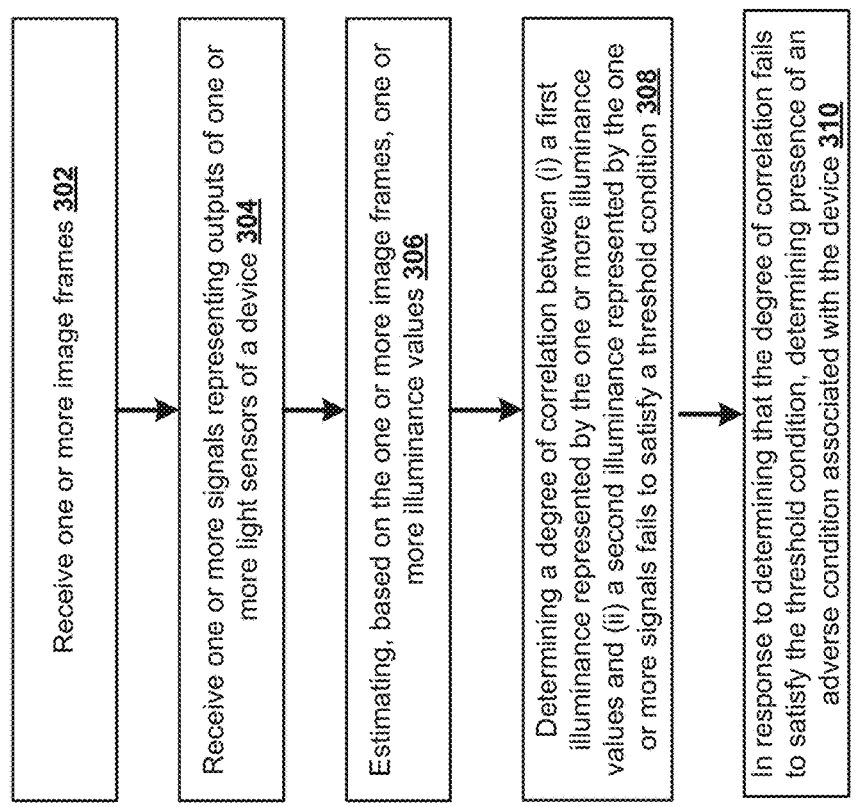
FIG. 3 is a flowchart of an example process employed for detecting hardware hijack or hardware malfunction in accordance with one or more embodiments of the present disclosure.

FIG. 3 depicts a flow diagram of an example process 300 for detecting hardware hijack or hardware malfunction in accordance with the technology described herein. In some implementations, at least portion of the process 300 can be executed by one or more processing devices disposed within a device, such as the device described above with reference to FIG. 1. In some implementations, at least a portion of the process 300 can be executed at one or more servers, such as servers or computing devices in a distributed computing system in communication with the one or more processing devices disposed within the device described above with reference to FIG. 1.

At 302, one or more image frames are received by the one or more processing devices at one or more locations. In some embodiments, a user may use a device to request a service or to request an access to certain resources. The device may include an image acquisition device, such as a camera, that can capture images of an object. For example, in biometric authentication systems, a user may hold the device (e.g., a cell phone) to scan his/her face for authentication. The camera of the cell phone can capture images of the user for face recognition or iris recognition. In another example, the user may hold the cell phone to scan documents. The camera of the cell phone can capture images of documents for further processing. The user's face and documents are provided as examples, other objects can be scanned within the described system. In some implementations, the camera can capture a plurality of consecutive image frames (e.g., a video feed) in the process of scanning an object, such as the user's face or documents. During the scanning process, one or more image frames can be captured by the camera and received by the one or more processing devices. Each of the one or more image frames is associated with a timestamp.

In camera hijack and video replay attacks, an attacker may hijack the camera drive and replace the camera output with the attacker's injected feed. In this context, the one or more image frames may be received from an attacker. It is important to detect such camera pipeline tampering to ensure the received image frames (e.g., face images or documents or other type camera scans) needed for various applications are trustworthy.

To detect camera pipeline tampering, illuminance values associated with a scene are derived in different ways. For example, as the user scans an object with his/her cell phone, the captured image frames may reflect the brightness/illuminance of the captured scene. In addition, the scenery illuminance can be detected by one or more light sensors, such as ambient light sensors. If both the image frames and the light sensors reflect the same scenery illuminance, it can be determined that the camera is not hijacked. As a result, one or more illuminance values (representing a first illuminance) derived from one or more image frames are compared with one or more signals (representing a second illuminance) from one or more light sensors. If they correlate with each other in a certain degree, it can be determined that the camera feed is from the legitimate device, and is being captured in real time. If they do not correlate to a certain degree, the one or more image frames and the light sensors are not demonstrating the same scenery illuminance, and it is determined that the camera is hijacked.

At 304, one or more signals representing outputs of the one or more light sensors of the device is received by the one or more processing devices. The device includes one or more light sensors. The light sensors of the device can collect the physical measurements indicative of the scenery illuminance. The one or more signals from the one or more light sensors can be hardware-based ambient light sensor readings. The light sensors of the device can be in proximity of the camera of the device. Each signal can be associated with a timestamp.

The one or more signals and the one or more image frames are synchronized in time domain based on the timestamp. As a result, the first illuminance and the second illuminance are synchronized in time domain. For each timestamp, corresponding to the camera-based image frame, the one or more processing devices identifies the ambient light sensor reading (e.g., signal) with the smallest absolute difference between their respective recorded timestamps. In some implementations, if the absolute difference between the timestamps of the image frame and the light sensor reading (e.g., signal) is less than or equal to a threshold (say 50 ms), the frame image and the corresponding light sensor reading are considered as a valid sample. Samples that do not meet the condition are not considered in the decision making and discarded. The threshold value for the difference between the timestamps can be based on the sampling rate of the light sensors.

At 306, one or more illuminance values are estimated based on the one or more image frames. The one or more illuminance values represent the first illuminance. The one or more illuminance values are estimated based on scenery included in the one or more image frames.

Estimating the one or more illuminance values can include estimating an illuminance value for each image frame based on one or more camera-based parameters. The one or more camera parameters include at least one of sensitivity to light (ISO), exposure time, and aperture. The parameter of sensitivity to light (ISO) is a camera setting that will brighten or darken an image. As the sensitivity to light is increased, the setting allows the camera to capture more light without slowing down the shutter speed or opening up the aperture. The sensitivity to light can help to capture images in darker environment, or be more flexible about aperture and shutter speed setting.

In some implementations, the one or more processing devices can estimate the illuminance value (referred to as Image Lux) for each image frame based on one or more camera-based parameters with the following formula:

$$\text{Image\_Lux} = \frac{K * \text{Img\_L} * F^2}{ISO * e_t}$$

where Img_L=convert image from RGB2Lab color space and take the mean of the luminance channel.
F=aperture number recorded by EXIF (exchangeable image file format) data
ISO=iso speed recorded by EXIF data
$e_t$=exposure time recorded by the EXIF
K=calibration constant At 308, a degree of correlation between the first illuminance represented by the one or more illuminance values and the second illuminance represented by the one or more signals is determined. Furthermore, it is determined that the degree of correlation fails to satisfy a threshold condition.

As discussed above, if the one or more image frames and the corresponding one or more signals from the light sensors reflect the same illuminance, a determination can be made that the camera (or other hardware such as the one or more light sensors) is not hijacked and the hardware is not malfunctioning. In operation, a degree of correlation between the first illuminance represented by the one or more illuminance values and the second illuminance represented by the one or more signals is determined. In some implementations, the degree of correlation is represented by a correlation coefficient.

In some implementations, very bright conditions are not considered due to the light sensor readings and the one or more illuminance values calculated from the image frames may not be accurate under bright conditions. For example, the decision is not made when the average of the one or more signals (e.g., light sensor readings) is greater than a threshold. The degree of correlation can be determined in different ways, including a static correlation determination process and a dynamic correlation determination process.

Static Correlation Determination Process

In a static correlation determination process, hijack/malfunction of a camera or light sensors can be determined based on a single image frame. In some implementations, once an illuminance value for a particular image frame is determined, a trained model can be used to obtain a predicted illuminance value of the particular image frame. The model can be trained, for example, using a training corpus of captured images and their corresponding light sensor data. A dissimilarity score can then be calculated between the calculated illuminance and the predicted illuminance to determine whether the calculated value is within a range of the predicted illuminance value (which represents the expected value based on information gleaned from the training corpus). The degree of the correlation is determined based on the dissimilarity score. For example, a lower dissimilarity score is associated with a higher degree of correlation.

In some implementations, separate trained models can be trained for different make/models of devices to account for device-to-device variations in hardware. For example, a set of training data may be obtained for a given make/model of a device. The set of training data may include a set of image frames and a set of corresponding signals of the light sensors that are obtained in normal condition (e.g., without hardware hijack/malfunction). For the set of image frames, the illuminance value corresponding to each image frame is estimated based on the scenery included in the image frame. The illuminance value of each image frame can be an image-based illuminance/lux value or a software-based illuminance value. For the set of corresponding signals, each signal can be an ambient light sensor reading or another hardware sensor configured to measure ambient light level.

After obtaining the image-based illuminance/lux values (e.g., software-based illuminance value) of the image frames and the corresponding light sensor readings (e.g., hardware-based illuminance value), the images can be placed into multiple bins for training purposes. For example, ten image-based lux bins are created after removing the outliers, for example, based on the interquartile range. Each bin can correspond to a different range of the illuminance. As a result, upon classification, each bin includes image-based illuminance values and the corresponding light sensor readings in a certain range. Within each range/bin, the mean and standard deviation (μ, a) of the light sensor readings are calculated. Such a trained classification model can indicate the correspondence between the first illuminance represented by the image-based illuminance values and the second illuminance represented by the light sensor readings in each range. The training corpus classified as above can then be used to train a model that represents a relationship between the image-based illuminance values and corresponding outputs of the one or more light sensors.

During run-time, for example, in implementations that use the static correlation determination process, after receiving a particular image frame and the corresponding signal of light sensors, the trained model can be invoked to determine a predicted illuminance value corresponding to the particular image frame. For example, one or more processing devices can be configured to identify an appropriate trained model corresponding to the particular image frame—for example, based on metadata information identifying the make/model of the source device—and use the model to determine a predicted illuminance based on the light sensor data corresponding to the particular image frame. The one or more processing devices can calculate a dissimilarity score between the predicted illuminance and the illuminance directly calculated from the particular image frame. The dissimilarity score can be used as a metric indicative of the correlation between the illuminance represented by the image frame and the illuminance calculated from the corresponding light sensor data. In this example, a higher dissimilarity score indicates a lower correlation and vice versa.

In some implementation, the dissimilarity score can be calculated as a function of mean and standard deviation of the light sensor readings. For example, assuming the received light sensor reading to be p, and the mean and standard deviation for the corresponding bin of the model are μ and σ, respectively, the dissimilarity score can be calculated as p−μ/σ. In some implementations, the presence of hardware hijack/malfunction can be determined by comparing the calculated dissimilarity score with a threshold value associated with the corresponding bin. Specifically, the mean and standard deviation for the corresponding bin of the model are μ and σ, the threshold value associated with the bin can be determined as (μ+3σ). Based on the 3-sigma rule or empirical rule, 99.7% of the samples fall within the first three standard deviations (μ+3σ), and hence the value (μ+3σ) can be used as a threshold for the corresponding bin. However, other more strict or relaxed thresholds can be used. If the dissimilarity score satisfies (e.g., is larger than or equal to) the threshold value, the one or more processing devices can determine the image frame and the light sensor reading are not correlated. Thus, the one or more processing device can determine that the hardware hijack/malfunction is present, and can reject the image frame and/or light sensor data.

Based on the threshold values, the statistical model has a GRR (genuine reject rate) of 0.7% and an IRR (imposter reject rate) of 9.34%. The GRR is corresponding to the reject rate of samples whose image-based lux value is correlated with the corresponding ambient light sensor reading. The IRR is corresponding to the reject rate of samples whose image-based lux is not correlated with the corresponding ambient light sensor reading.

Dynamic Correlation Determination Process

In some embodiments, the one or more processing devices can determine the degree of correlation via a dynamic correlation determination process, where the correlation between the hardware-based ambient light sensor values and the software-based lux calculation (image-based lux calculation) is determined based on multiple image frames.

In the dynamic correlation, a time-series set of the image frames and a corresponding time-series set of light sensor readings are considered to determine a degree of correlation. A synchronization process can be used to relate the light sensor readings to corresponding image frames. For example, if a timestamp associated with a light sensor reading in a time series is within a threshold distance of a timestamp corresponding to an image frame of a time-series, the reading is associated with the image frame. In the dynamic correlation, a correlation between two synchronized time series data—with a first time series representing a set of two or more image frames and a second time series representing a corresponding set of light sensor readings—are determined. In some implementations, the image frames are pre-processed based on one or more criteria, for example, to discard frames that are unusable or unsuitable. For example, if the light sensor reading corresponding to a frame is less than a threshold value, the frame and the related light sensor reading may be discarded from the corresponding time series data. The one or more processing devices can then determine the degree of correlation between the first time series and the second time series. In some implementations, determining the degree of the correlation includes computing a correlation coefficient. In the absence of any adverse condition, the two time series data are correlated with one another.

Continuing with the process 300, at 310, in response to determining that the degree of correlation fails to satisfy the threshold condition, it is determined that an adverse condition associated with the device is present. If the degree of correlation fails to satisfy the threshold condition, it can be determined that the first illuminance derived from the one or more image frames and the second illuminance represented by the one or more signals do not track each other, and hence either the camera or the light sensors have likely been subject to an adverse condition such as a hardware hijack or malfunction. In some implementations that use the static correlation determination to determine a dissimilarity score, determining that the degree of correlation fails to satisfy the threshold condition includes determining that the dissimilarity score satisfies a threshold value, as discussed above.

In some implementations, besides the binary decision on presence of adverse condition, a soft confident score can be determined using the degree of correlation. The soft confidence score can be determined using other signal similarity metrics, such as intersection over union.

Once the adverse condition is identified, subsequent processes can be implemented to minimize the impacts of the adverse condition. For example, a service or an access requested by a user may be denied. An alert may be presented to the user. In some other embodiments, the processing device may communicate with other entities to warn the other entities of the adverse conditions. In some other embodiments, further authentication process may be initiated to increase the security of the system.

Figure 4:
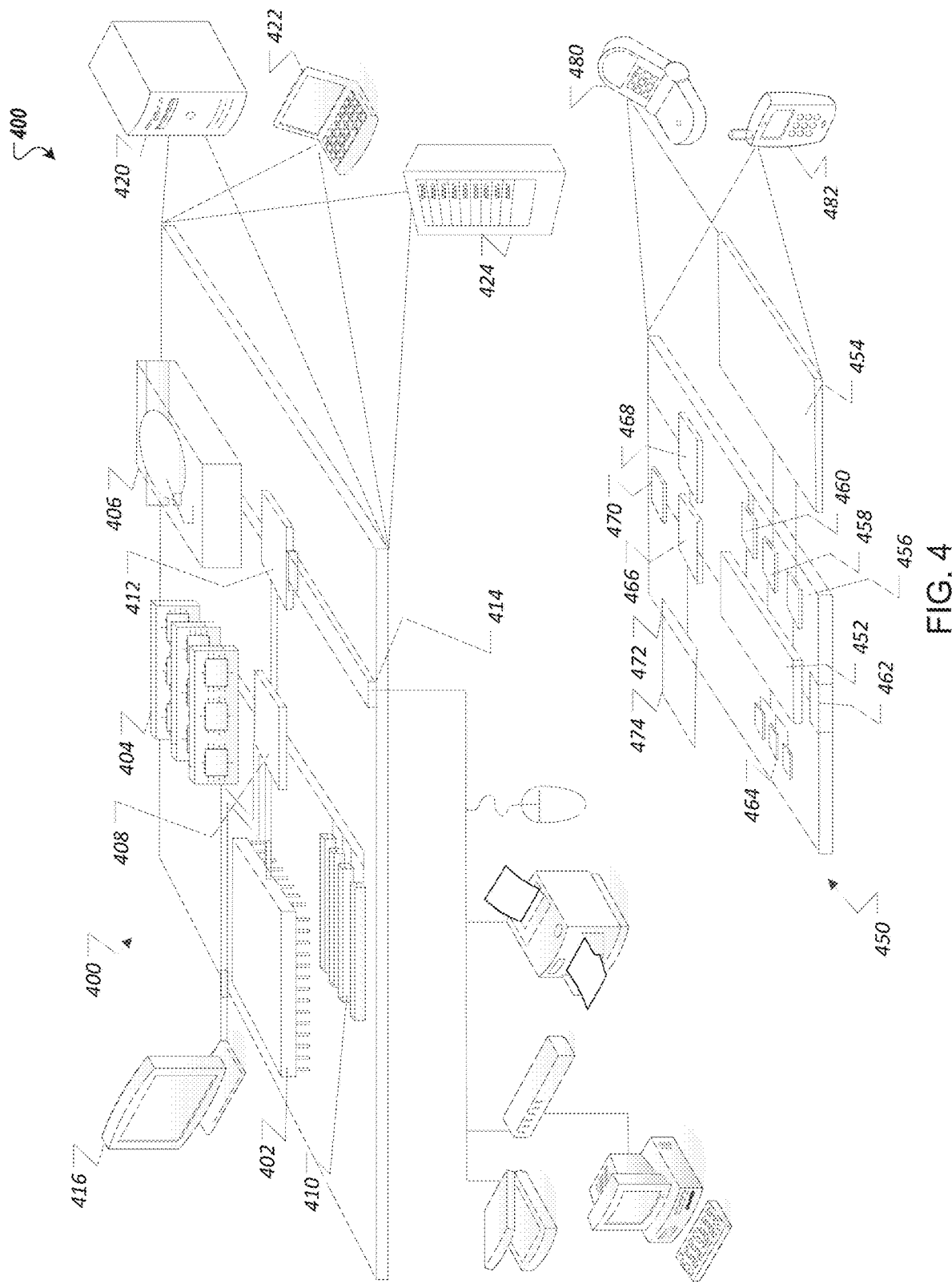
FIG. 4 is a block diagram representing examples of computing devices in accordance with one or more embodiments of the present disclosure.

FIG. 4 shows an example of a computing device 400 and a mobile computing device 450 that are employed to execute implementations of the present disclosure. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, AR devices, and other similar computing devices. The components shown here, their connections and relationships, and their functions, are meant to be examples only, and are not meant to be limiting.

The computing device 400 includes a processor 402, a memory 404, a storage device 406, a high-speed interface 408, and a low-speed interface 412. In some implementations, the high-speed interface 408 connects to the memory 404 and multiple high-speed expansion ports 410. In some implementations, the low-speed interface 412 connects to a low-speed expansion port 414 and the storage device 406. Each of the processor 402, the memory 404, the storage device 406, the high-speed interface 408, the high-speed expansion ports 410, and the low-speed interface 412, are interconnected using various buses, and may be mounted on a common motherboard or in other manners as appropriate. The processor 402 can process instructions for execution within the computing device 400, including instructions stored in the memory 404 and/or on the storage device 406 to display graphical information for a graphical user interface (GUI) on an external input/output device, such as a display 416 coupled to the high-speed interface 408. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of a computer-readable medium, such as a magnetic or optical disk.

The storage device 406 is capable of providing mass storage for the computing device 400. In some implementations, the storage device 406 may be or include a computer-readable medium, such as a floppy disk device, a hard disk device, an optical disk device, a tape device, a flash memory, or other similar solid-state memory device, or an array of devices, including devices in a storage area network or other configurations. Instructions can be stored in an information carrier. The instructions, when executed by one or more processing devices, such as processor 402, perform one or more methods, such as those described above. The instructions can also be stored by one or more storage devices, such as computer-readable or machine-readable mediums, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards. In the implementation, the low-speed interface 412 is coupled to the storage device 406 and the low-speed expansion port 414. The low-speed expansion port 414, which may include various communication ports (e.g., Universal Serial Bus (USB), Bluetooth, Ethernet, wireless Ethernet) may be coupled to one or more input/output devices. Such input/output devices may include a scanner, a printing device, or a keyboard or mouse. The input/output devices may also be coupled to the low-speed expansion port 414 through a network adapter. Such network input/output devices may include, for example, a switch or router.

The computing device 400 may be implemented in a number of different forms, as shown in the FIG. 4. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device, such as a mobile computing device 450. Each of such devices may contain one or more of the computing device 400 and the mobile computing device 450, and an entire system may be made up of multiple computing devices communicating with each other.

The mobile computing device 450 includes a processor 452; a memory 464; an input/output device, such as a display 454; a communication interface 466; and a transceiver 468; among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate. In some implementations, the mobile computing device 450 may include a camera device(s) (not shown).

The processor 452 can execute instructions within the mobile computing device 450, including instructions stored in the memory 464. The processor 452 may be implemented as a chipset of chips that include separate and multiple analog and digital processors. For example, the processor 452 may be a Complex Instruction Set Computers (CISC) processor, a Reduced Instruction Set Computer (RISC) processor, or a Minimal Instruction Set Computer (MISC) processor. The processor 452 may provide, for example, for coordination of the other components of the mobile computing device 450, such as control of user interfaces (UIs), applications run by the mobile computing device 450, and/or wireless communication by the mobile computing device 450.

The processor 452 may communicate with a user through a control interface 458 and a display interface 456 coupled to the display 454. The display 454 may be, for example, a Thin-Film-Transistor Liquid Crystal Display (TFT) display, an Organic Light Emitting Diode (OLED) display, or other appropriate display technology. The display interface 456 may include appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a Single in Line Memory Module (SIMM) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or non-volatile random access memory (NVRAM), as discussed below. In some implementations, instructions are stored in an information carrier. The instructions, when executed by one or more processing devices, such as processor 452, perform one or more methods, such as those described above. The instructions can also be stored by one or more storage devices, such as one or more computer-readable or machine-readable mediums, such as the memory 464, the expansion memory 474, or memory on the processor 452. In some implementations, the instructions can be received in a propagated signal, such as, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as Global System for Mobile communications (GSM) voice calls, Short Message Service (SMS), Enhanced Messaging Service (EMS), Multimedia Messaging Service (MMS) messaging, code division multiple access (CDMA), time division multiple access (TDMA), Personal Digital Cellular (PDC), Wideband Code Division Multiple Access (WCDMA), CDMA2000, General Packet Radio Service (GPRS). Such communication may occur, for example, through the transceiver 468 using a radio frequency. In addition, short-range communication, such as using a Bluetooth or Wi-Fi, may occur. In addition, a Global Positioning System (GPS) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in FIG. 4. For example, it may be implemented in the mobile device 100 described in FIG. 1. Other implementations may include a phone device 482 and a tablet device 484. The mobile computing device 450 may also be implemented as a component of a smart-phone, personal digital assistant, AR device, or other similar mobile device.

Computing device 400 and/or 450 can also include USB flash drives. The USB flash drives may store operating systems and other applications. The USB flash drives can include input/output components, such as a wireless transmitter or USB connector that may be inserted into a USB port of another computing device.

Figure 5:
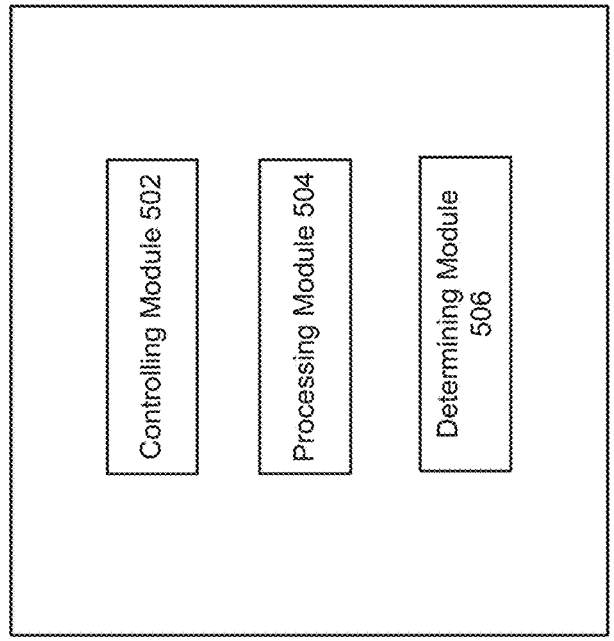
FIG. 5 depicts examples of modules of an apparatus in accordance with one or more embodiments of the present disclosure.

FIG. 5 depicts examples of modules of an apparatus 500 in accordance with one or more embodiments of the present disclosure. The apparatus 500 can be an example of an embodiment of a system configured to detect hardware hijack or hardware malfunction. The apparatus 500 can correspond to the embodiments described above, and the apparatus 500 includes the following: a controlling module 502 that controls an image acquisition device, such as a camera, to capture one or more image frames and controls one or more light sensors to generate signals representing outputs of the one or more light sensors; a processing module 504 that processes the one or more image frames and the signals from the light sensors to calculate a degree of correlation between a first illuminance derived from the one or more image frames and a second illuminance represented by the signals of the light sensors; and a determining module 506 that determines presence of an adverse condition in response to determining that the degree of correlation fails to satisfy a threshold condition.

In some embodiments, the controlling module 502 controls the image acquisition device to capture one or more image frames. Each image frame is associated with a timestamp. The controlling module 502 controls the light sensors to generate the signals or output readings in a certain sampling rate. The one or more signals and the one or more image frames are synchronized in time domain based on the timestamp.

In some embodiments, the processing module 504 estimates one or more illuminance values from the one or more image frames. The one or more illuminance values are estimated based on scenery included in the one or more image frames. Estimating the one or more illuminance values can include estimating an illuminance value for each image frame based on one or more camera-based parameters. The one or more camera parameters include at least one of sensitivity to light, exposure time, and aperture.

In some embodiments, the processing module 504 calculate a degree of correlation between the first illuminance represented by the one or more illuminance values and the second illuminance represented by the one or more signals from the light sensors. The degree of correlation can be determined in different ways, including a static correlation determination process and a dynamic correlation determination process.

In the static correlation determination process, hardware hijack/malfunction of a camera or light sensors can be determined based on a single image frame. The processing module 504 trains, using a training corpus of images and their corresponding light sensor data that are obtained in normal condition (e.g., without hardware hijack/malfunction), a model that indicate the correspondence between the first illuminance represented by the image-based illuminance values and the second illuminance represented by the light sensor readings. The processing module 504 trains separate models for different make/models of devices.

In implementations that use the static correlation determination process, after receiving a particular image frame and the corresponding signal of light sensors, the processing module 504 determines an illuminance value corresponding to the particular image frame. The processing module 504 identifies an appropriate trained model corresponding to the particular image frame, for example, based on the metadata information identifying the make/model of the source device. The processing module 504 invokes the trained model to determine a predicted illuminance value corresponding to the particular image frame based on the light sensor data. The processing module 504 calculates a dissimilarity score between the predicted illuminance and the illuminance directly calculated from the particular image frame. The dissimilarity score can be used as a metric indicative of the correlation between the illuminance represented by the image frame and the illuminance calculated from the corresponding light sensor data. A lower dissimilarity score is associated with a higher degree of correlation.

In the dynamic correlation determination process, the correlation between the hardware-based ambient light sensor values and the software-based lux calculation (image-based lux calculation) is determined based on multiple image frames. The processing module 504 receives a time-series set of the image frames and a corresponding time-series set of light sensor readings. The processing module 504 uses a synchronization process to relate the light sensor readings to corresponding image frames. The processing module 504 determines a correlation between the two synchronized time series data—with a first time series representing a set of two or more image frames and a second time series representing a corresponding set of light sensor readings.

In some embodiments, the determining module 506 determines presence of an adverse condition in response to determining that the degree of correlation fails to satisfy a threshold condition. If the degree of correlation fails to satisfy the threshold condition, the determining module 506 determines that the first illuminance derived from the one or more image frames and the second illuminance represented by the one or more signals do not track each other. As a result, the determining module 506 determines that either camera or the light sensors have likely been subject to an adverse condition such as a hardware hijack or malfunction. The hardware can be at least one of the camera and the one or more light sensors of the device.

Various implementations of the systems and techniques described here can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which may be for a special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural, object-oriented, assembly, and/or machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a cathode ray tube (CRT) or liquid crystal display (LCD) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a GUI or a web browser through which a user can interact with an implementation of the systems and techniques described here), or any combination of such back end, middleware, or front end components. The components of the system can be interconnected by any form or medium of digital data communication. Examples of communication networks include a LAN, a WAN, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
    receiving, at one or more processing devices at one or more locations, one or more image frames from an imaging device;
    receiving, at the one or more processing devices, one or more signals representing outputs of one or more light sensors of a device, wherein the one or more light sensors are different from the imaging device, and the one or more light sensors and the imaging device are located in a same environment;
    estimating, by the one or more processing devices based on the one or more image frames, one or more illuminance values;
    determining, by the one or more processing devices, a degree of correlation between (i) a first illuminance, represented by the one or more illuminance values, that indicates an illuminance of a scenery captured in the one or more image frames, and (ii) a second illuminance, represented by the one or more signals, that indicates an illuminance of the same environment in which the one or more light sensors and the imaging device are located;
    determining, by the one or more processing device, that the degree of correlation fails to satisfy a threshold condition; and
    in response to determining that the degree of correlation fails to satisfy the threshold condition, determining, by the one or more processing devices, presence of an adverse condition associated with the device.

2. The computer-implemented method of claim 1, wherein the adverse condition comprises one of hardware hijack or hardware malfunction.

3. The computer-implemented method of claim 2, wherein the hardware comprises at least one of a camera and the one or more light sensors of the device.

4. The computer-implemented method of claim 1, wherein estimating the one or more illuminance values comprises:
    estimating an illuminance value corresponding to each image frame based on one or more camera parameters.

5. The computer-implemented method of claim 4, wherein the one or more camera parameters include at least one of: sensitivity to light (ISO), exposure time, and aperture.

6. The computer-implemented method of claim 1, wherein determining the degree of correlation between the first illuminance and the second illuminance comprises:
    identifying, based on the one or more signals representing outputs of the one or more light sensors of the device, and from a trained model that represents a relationship between illuminance values and corresponding outputs of the one or more light sensors, a predicted illuminance as the second illuminance;
    calculating a dissimilarity score between the predicted illuminance and the first illuminance; and
    determining the degree of correlation based on the dissimilarity score, wherein a lower dissimilarity score is associated with a higher degree of correlation.

7. The computer-implemented method of claim 1, wherein determining the degree of correlation between the first illuminance and the second illuminance comprises:
    receiving a plurality of image frames;
    estimating a first time series of illuminance values corresponding to the plurality of image frames;
    estimating a second time series representing the outputs of the one or more light sensors of the device corresponding to the plurality of image frames; and
    determining the degree of correlation between the first time series and the second time series.

8. The computer-implemented method of claim 7, wherein determining the degree of correlation between the first time series and the second time series comprises computing a correlation coefficient.

9. A computer-implemented system, comprising:
    one or more processing devices; and
    one or more computer memory devices interoperably coupled with the one or more processing devices and having tangible, non-transitory, machine-readable media storing one or more instructions that, when executed by the one or more computing devices, perform one or more operations comprising:

receiving, at one or more locations, one or more image frames from an imaging device;

receiving one or more signals representing outputs of one or more light sensors of a device, wherein the one or more light sensors are different from the imaging device, and the one or more light sensors and the imaging device are located in a same environment;

estimating, based on the one or more image frames, one or more illuminance values;

determining a degree of correlation between (i) a first illuminance, represented by the one or more illuminance values, that indicates an illuminance of a scenery captured in the one or more image frames, and (ii) a second illuminance, represented by the one or more signals, that indicates an illuminance of the same environment in which the one or more light sensors and the imaging device are located;

determining that the degree of correlation fails to satisfy a threshold condition; and in response to determining that the degree of correlation fails to satisfy the threshold condition, determining presence of an adverse condition associated with the device.

10. The computer-implemented system of claim 9, wherein the adverse condition comprises one of hardware hijack or hardware malfunction.

11. The computer-implemented system of claim 10, wherein the hardware comprises at least one of a camera and the one or more light sensors of the device.

12. The computer-implemented system of claim 9, wherein estimating the one or more illuminance values comprises:

estimating an illuminance value corresponding to each image frame based on one or more camera parameters.

13. The computer-implemented system of claim 12, wherein the one or more camera parameters include at least one of: sensitivity to light (ISO), exposure time, and aperture.

14. The computer-implemented system of claim 9, wherein determining the degree of correlation between the first illuminance and the second illuminance comprises:

identifying, based on the one or more signals representing outputs of the one or more light sensors of the device, and from a trained model that represents a relationship between illuminance values and corresponding outputs of the one or more light sensors, a predicted illuminance as the second illuminance;

calculating a dissimilarity score between the predicted illuminance and the first illuminance; and determining the degree of correlation based on the dissimilarity score, wherein a lower dissimilarity score is associated with a higher degree of correlation.

15. The computer-implemented system of claim 9, wherein determining the degree of correlation between the first illuminance and the second illuminance comprises:

receiving a plurality of image frames;

estimating a first time series of illuminance values corresponding to the plurality of image frames;

estimating a second time series representing the outputs of the one or more light sensors of the device corresponding to the plurality of image frames; and determining the degree of correlation between the first time series and the second time series.

16. The computer-implemented system of claim 15, wherein determining the degree of correlation between the first time series and the second time series comprises computing a correlation coefficient.

17. One or more non-transitory computer-readable storage devices coupled to one or more processors and having instructions stored thereon which, when executed by the one or more processors, cause the one or more processors to perform operations comprising:

receiving, at one or more locations, one or more image frames from an imaging device;

receiving one or more signals representing outputs of one or more light sensors of a device, wherein the one or more light sensors are different from the imaging device, and the one or more light sensors and the imaging device are located in a same environment;

estimating, based on the one or more image frames, one or more illuminance values;

determining a degree of correlation between (i) a first illuminance, represented by the one or more illuminance values, that indicates an illuminance of a scenery captured in the one or more image frames, and (ii) a second illuminance, represented by the one or more signals, that indicates an illuminance of the same environment in which the one or more light sensors and the imaging device are located;

determining that the degree of correlation fails to satisfy a threshold condition; and in response to determining that the degree of correlation fails to satisfy the threshold condition, determining presence of an adverse condition associated with the device.

18. The one or more non-transitory computer-readable storage devices of claim 17, wherein the adverse condition comprises one of hardware hijack or hardware malfunction.

19. The one or more non-transitory computer-readable storage devices of claim 18, wherein the hardware comprises at least one of a camera and the one or more light sensors of the device.

20. The one or more non-transitory computer-readable storage devices of claim 17, wherein estimating the one or more illuminance values comprises:

estimating an illuminance value corresponding to each image frame based on one or more camera parameters.

* * * * *